United States Patent
Kao

(10) Patent No.: US 10,124,734 B1
(45) Date of Patent: Nov. 13, 2018

(54) VEHICLE MIRROR ASSEMBLY

(71) Applicant: TKS INDUSTRIAL CO., LTD., Tainan (TW)

(72) Inventor: Chung-Hsu Kao, Tainan (TW)

(73) Assignee: TKS INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 15/658,767

(22) Filed: Jul. 25, 2017

(51) Int. Cl.
| | | |
|---|---|---|
| *B60Q 1/00* | (2006.01) | |
| *F21V 21/28* | (2006.01) | |
| *F21V 21/29* | (2006.01) | |
| *B60R 1/12* | (2006.01) | |
| *B60Q 1/26* | (2006.01) | |
| *B60R 1/06* | (2006.01) | |
| *B60Q 1/52* | (2006.01) | |
| *F21S 43/37* | (2018.01) | |
| *F21S 43/40* | (2018.01) | |
| *F21S 43/27* | (2018.01) | |

(52) U.S. Cl.
CPC .......... *B60R 1/1207* (2013.01); *B60Q 1/2665* (2013.01); *B60Q 1/525* (2013.01); *B60R 1/06* (2013.01); *F21S 43/27* (2018.01); *F21S 43/37* (2018.01); *F21S 43/40* (2018.01)

(58) Field of Classification Search
USPC .................................................. 362/464, 494
See application file for complete search history.

(56) References Cited

U.S. PATENT DOCUMENTS

| | | | | |
|---|---|---|---|---|
| 4,300,123 | A * | 11/1981 | McMillin | G06K 7/015 235/436 |
| 5,497,306 | A * | 3/1996 | Pastrick | B60Q 1/2665 362/494 |
| 6,168,277 | B1 * | 1/2001 | Kanazawa | B60R 1/086 359/603 |
| 2005/0265037 | A1 * | 12/2005 | Newton | B60Q 1/2665 362/494 |
| 2005/0276059 | A1 * | 12/2005 | Rodriguez Barros | B60Q 1/2665 362/494 |
| 2010/0182143 | A1 * | 7/2010 | Lynam | B60R 1/1207 340/465 |

* cited by examiner

*Primary Examiner* — Tuyen K Vo

(74) *Attorney, Agent, or Firm* — Osha Liang LLP

(57) ABSTRACT

A vehicle mirror assembly includes a mirror casing, a mirror, a prism member, and a light emitting member. The prism member is disposed forwardly of a light emitting region of the mirror, and has a front major surface formed with a plurality of parallel prism grooves. The light emitting member is configured to permit a light beam to emit therefrom along a beam axis in response to the detection of another vehicle's approach, and is disposed to permit the beam axis to be oriented substantially perpendicular to groove axes of the prism grooves.

7 Claims, 6 Drawing Sheets

VEHICLE MIRROR ASSEMBLY

FIELD

The disclosure relates to a vehicle mirror assembly, more particularly to a vehicle mirror assembly adapted to direct light toward a driver of a vehicle in response to detection of another vehicle's approach into a blind spot of the vehicle.

BACKGROUND

A conventional vehicle mirror device 10 includes a mirror casing 100, a mirror 101 retained by the mirror casing 100, and a blind spot warning device 1 which includes a sensor 14 and a light emitting member 15. When approach of another vehicle (not shown) into a blind spot (not shown) of a vehicle (not shown) with the vehicle mirror device 10 is detected by the sensor 14, the light emitting member 15 will emit light so as to alert the driver of the vehicle.

U.S. patent publication No. 2017028925 A1 discloses a door mirror device has a main mirror having a first reflecting surface that enables a periphery of a vehicle to be viewed, and a sub-mirror that is disposed adjacent to the main mirror. The sub-mirror includes a light guide having a light guiding portion into which light from an LED is introduced. A second reflecting surface, that enables a periphery of the vehicle to be viewed, is provided at a surface of the light guide. Further, a light portion, that illuminates, toward an out-of-plane direction of the second reflecting surface, light from the LED that has been introduced into the light guide interior, is provided at the second reflecting surface.

SUMMARY

An object of the disclosure is to provide a novel vehicle mirror assembly.

According to the disclosure, a vehicle mirror assembly is adapted to direct light toward a driver of a vehicle in response to detection of another vehicle's approach into a blind spot of the vehicle. The vehicle mirror assembly includes a mirror casing, a mirror, a prism member, and a light emitting member. The mirror casing defines therein a cavity, and has a rearward wall with an access opening in spatial communication with the cavity. The mirror is configured to be fitted in the access opening, and has a predetermine zone which is formed with at least one light transmissive region. The prism member is disposed in the cavity and forwardly of the predetermined zone, and has a rear major surface and a front major surface that are substantially parallel to the mirror. The front major surface is formed with a plurality of prism grooves each extending along a groove axis. The groove axes of the prism grooves are substantially parallel to each other. The light emitting member is configured to permit a light beam to emit therefrom along a beam axis in response to the detection of another vehicle's approach, and is disposed to permit the beam axis to be oriented substantially perpendicular to the groove axes such that as a result of refraction and reflection of the light beam by the prism grooves, the final paths of the light beam are directed substantially normal to the rear major surface so as to allow the light beam to pass through the light transmissive region with enhanced luminance.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
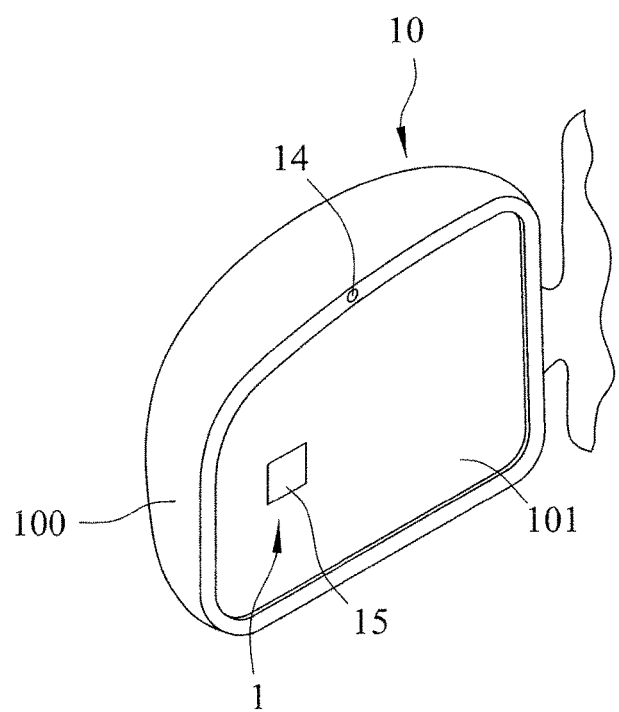
FIG. 1 is a schematic perspective view of a conventional vehicle mirror device.
Figure 2:
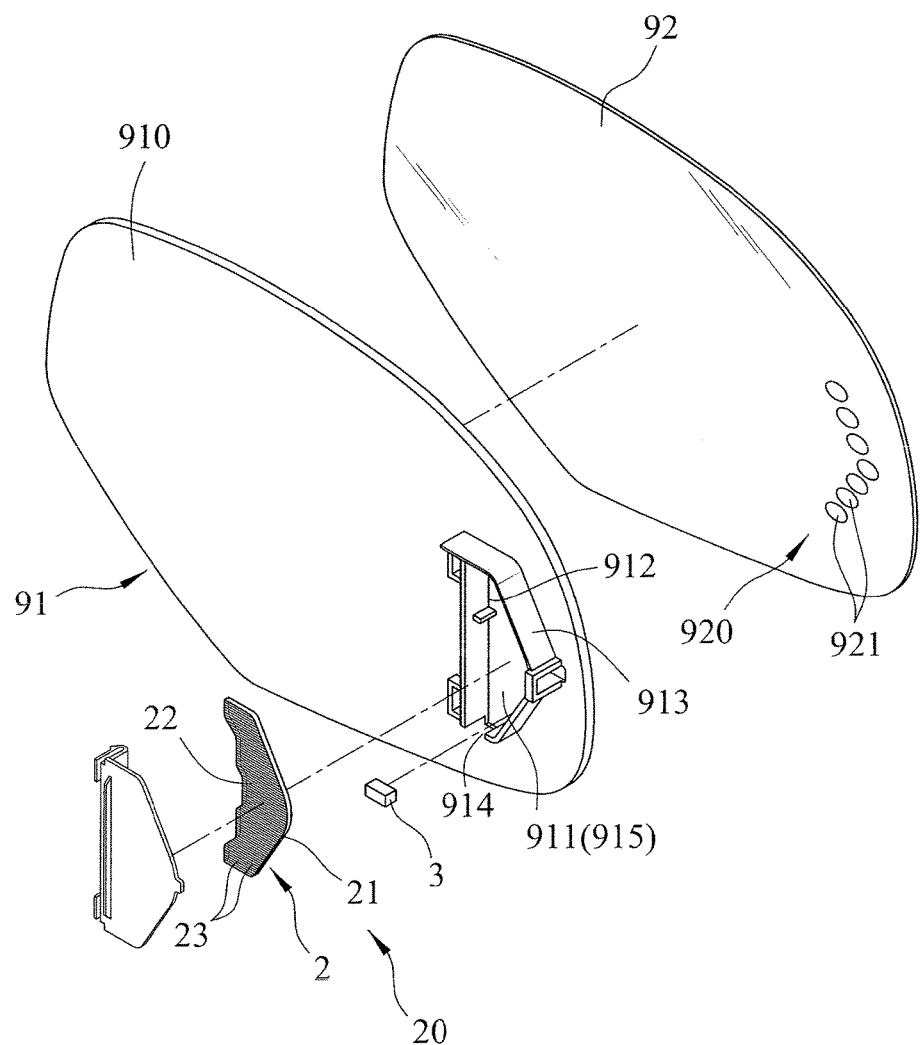
FIG. 2 is an exploded perspective view illustrating some elements in a vehicle mirror assembly according to an embodiment of the disclosure.
Figure 6:
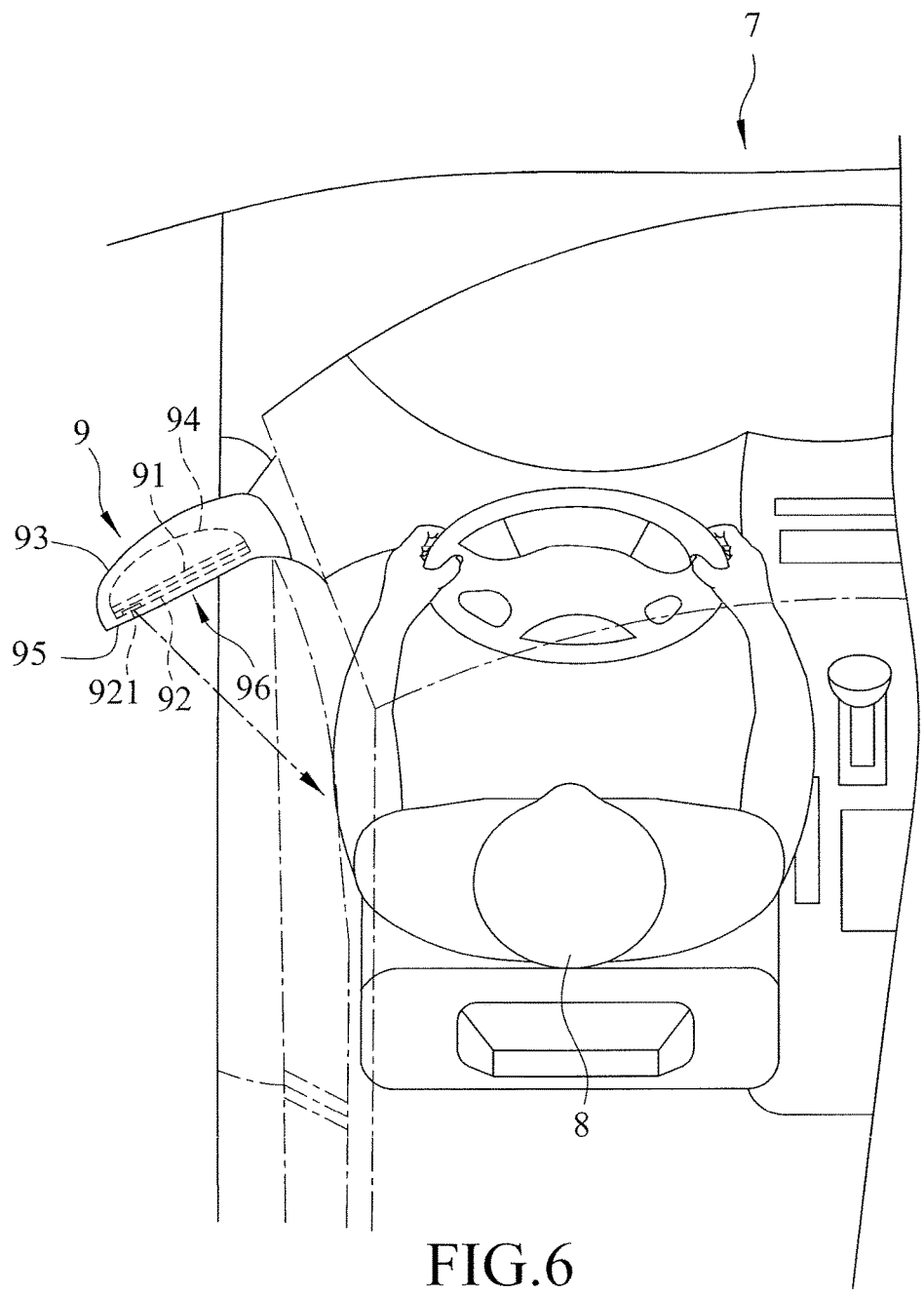
FIG. 6 is a schematic view illustrating a vehicle with the vehicle mirror assembly.

Referring to FIGS. 2 and 6, a vehicle mirror assembly 9 according to the disclosure is adapted to direct light toward a driver 8 of a vehicle 7 in response to detection of another vehicle's approach into a blind spot (not shown) of the vehicle 7, and is shown to include a mirror casing 93, a mirror 92, and a blind spot warning subassembly 20 including a prism member 2 and a light emitting member 3. The approach of another vehicle (not shown) can be detected by a conventional sensor (not shown), and the light emitting member 3 can be actuated to emit light after receiving a signal from the conventional sensor. The technology for transmitting a signal from the conventional sensor to the light emitting member 3 is well-known in the art, and the detailed thereof thus is omitted for sake of clarity.

As shown in FIG. 6, the mirror casing 93 defines therein a cavity 94, and has a rearward wall 95 with an access opening 96 in spatial communication with the cavity 94.

Referring to FIGS. 2 and 6, the mirror 92 is configured to be fitted in the access opening 96, and has a predetermine zone 920 which is formed with at least one light transmissive region 921. In this embodiment, the predetermined zone 920 is formed with a plurality of light transmissive regions 921.

Figure 3:
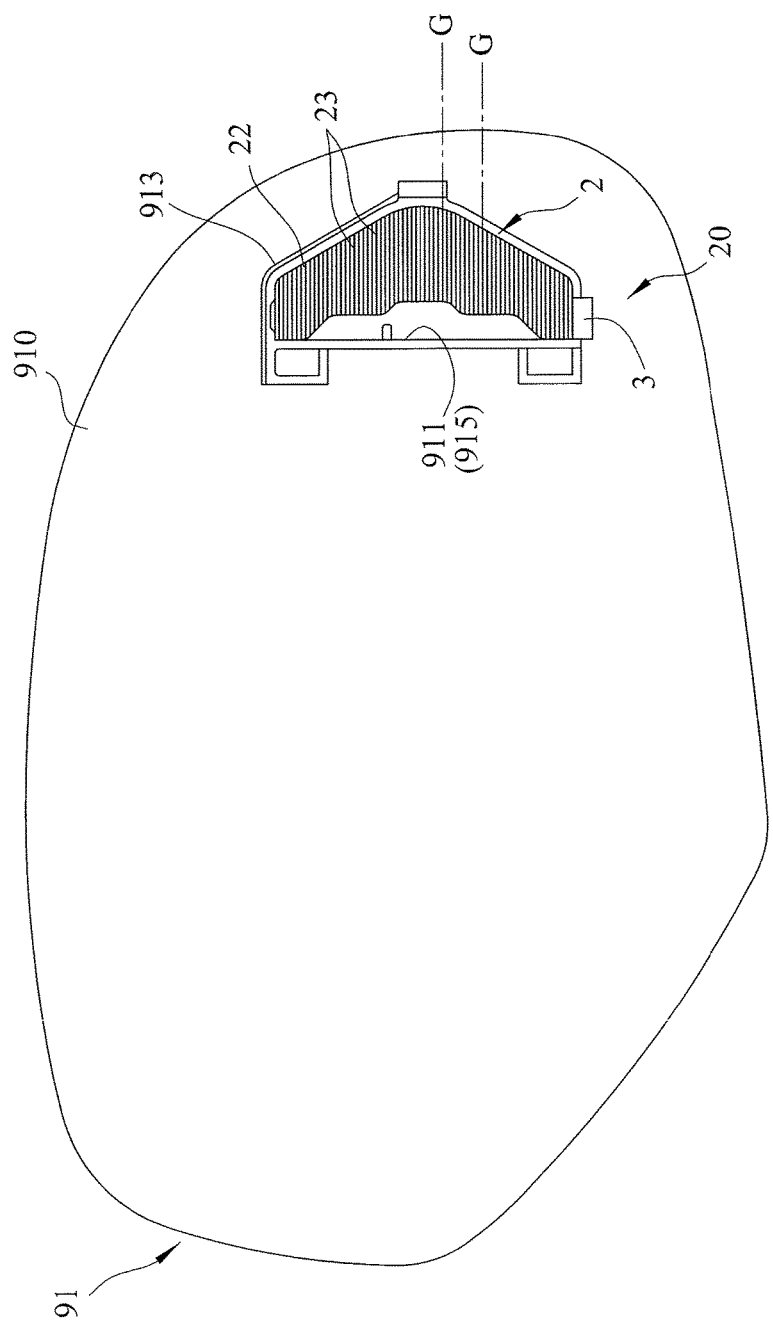
FIG. 3 is a front view of a blind spot warning subassembly of the vehicle mirror assembly.
Figure 4:
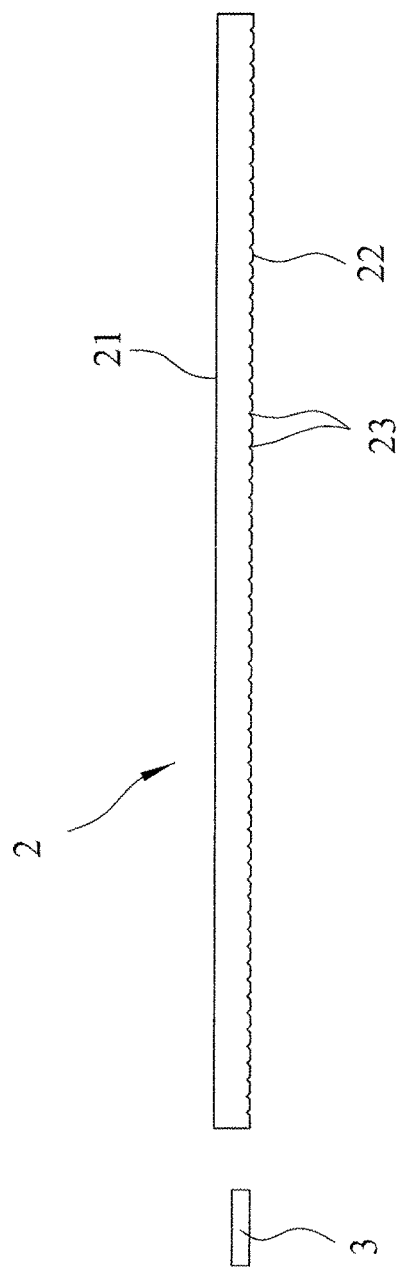
FIG. 4 is a side view illustrating a prism member and a light emitting member of the blind spot warning subassembly.

The prism member 2 is disposed in the cavity 94 and forwardly of the predetermined zone 920, and has a rear major surface 21 and a front major surface 22 that are substantially parallel to the mirror 92. As shown in FIGS. 3 and 4, the front major surface 22 is formed with a plurality of prism grooves 23 each extending along a groove axis (G). The groove axes (G) of the prism grooves 23 are substantially parallel to each other.

The light emitting member 3 is configured to permit a light beam (L) to emit therefrom along a beam axis (B) in response to the detection of another vehicle's approach, and is disposed to permit the beam axis (B) to be oriented substantially perpendicular to the groove axes (G). As a result of refraction and reflection of the light beam (L) by the prism grooves 23 (see FIG. 5), the final paths of the light beam (L) are directed substantially normal to the rear major surface 21 so as to allow the light beam (L) to pass through the light transmissive region 921 with enhanced luminance.

Figure 5:
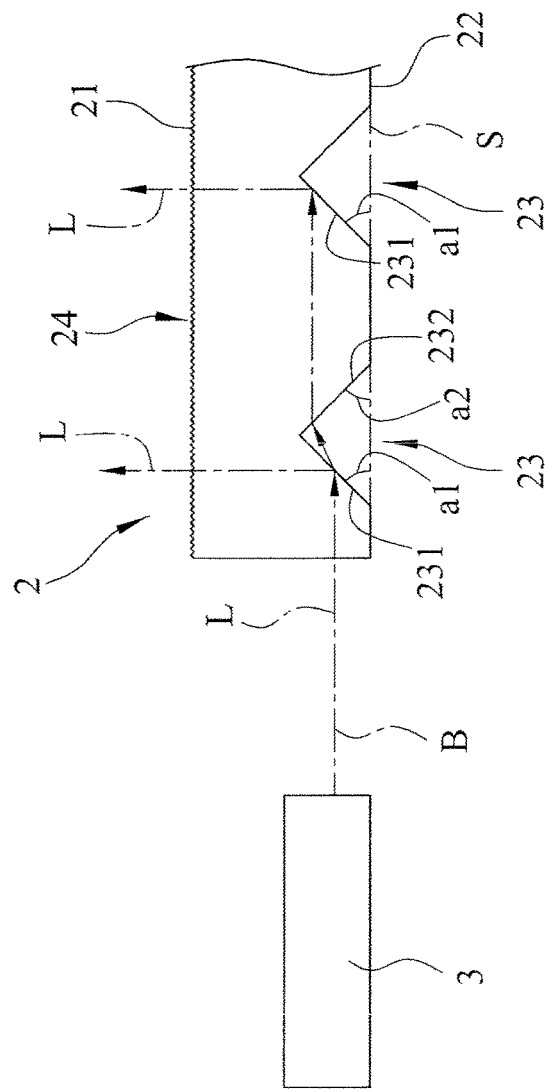
FIG. 5 is a fragmentary enlarged view of FIG. 4 illustrating paths of a light beam from the light emitting member.

In this embodiment, as shown in FIG. 5, the front major surface 22 defines a reference plane (S), and each of the prism grooves 23 has two sidewalls 231, 232 each of which defines an included angle (a1 or a2) of 45° with the reference plane (S) of the front major surface 22.

Furthermore, the rear major surface 21 is formed with a diffusing region 24 for diffusing the light beam (L) passing therethrough. In this embodiment, the diffusing region 24 is formed by sandblasting.

Please note that with the provision of the prism member 2, the light transmissive regions 921 can exhibit a luminance sufficient to alert the driver using a single light emitting member 3.

In this embodiment, the vehicle mirror assembly 9 further includes a mounting plate 91. The mounting plate 91 includes a plate body 910 with a contour configured to simulate a contour of the mirror 92 so as to be fitted in the cavity 94 and disposed forwardly of the mirror 92. The mounting plate 91 is configured to permit the prism member 2 and the light emitting member 3 to be mounted thereon.

In this embodiment, as shown in FIGS. 2 and 3, the plate body 910 is disposed immediately in front of the mirror 92, and defines a light transmissive area 911 with a boundary 912, which is in position corresponding to the predetermined zone 920.

Moreover, the mounting plate 91 further includes a fitting frame 913. As shown in FIG. 2, the fitting frame 913 extends forwardly from the boundary 912, and is configured to permit the prism member 2 to be fitted therein. The fitting frame 913 is cut rearwardly to form a slot 914 which is configured to permit the light emitting member 3 to be fitted therein and to allow the beam axis (B) to be oriented substantially perpendicular to the groove axes (G) (see also FIGS. 3 and 5).

In this embodiment, the light transmissive area 911 is a through bore 915.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vehicle mirror assembly configured to direct light toward a driver of a vehicle in response to detection of another vehicle's approach into a blind spot of the vehicle, said vehicle mirror assembly comprising:

a mirror casing defining therein a cavity, and having a rearward wall with an access opening in spatial communication with said cavity;
   a mirror configured to be fitted in said access opening, and having a predetermine zone which is formed with at least one light transmissive region;
   a prism member which is disposed in said cavity and forwardly of said predetermined zone, and which has a rear major surface and a front major surface that are parallel to said mirror, said front major surface being formed with a plurality of prism grooves each extending along a groove axis, the groove axes of said prism grooves being parallel to each other; and
   a light emitting member which is configured to permit a light beam to emit therefrom along a beam axis in response to the detection of another vehicle's approach, and which is disposed to permit the beam axis to be oriented perpendicular to the groove axes such that as a result of refraction and reflection of the light beam by said prism grooves, the final paths of the light beam are directed normal to said rear major surface so as to allow the light beam to pass through said light transmissive region with enhanced luminance.

2. The vehicle mirror assembly according to claim 1, further comprising a mounting plate which includes a plate body with a contour configured to simulate a contour of said mirror so as to be fitted in said cavity and disposed forwardly of said mirror, and which is configured to permit said prism member and said light emitting member to be mounted thereon.

3. The vehicle mirror assembly according to claim 2, wherein said plate body is disposed immediately in front of said mirror, and defines a light transmissive area with a boundary, which is in position corresponding to said predetermined zone, said mounting plate further includes
   a fitting frame which extends forwardly from said boundary, and which is configured to permit said prism member to be fitted therein, said fitting frame being cut rearwardly to form a slot which is configured to permit said light emitting member to be fitted therein and to allow the beam axis to be oriented perpendicular to the groove axes.

4. The vehicle mirror assembly according to claim 3, wherein said light transmissive area is a through bore.

5. The vehicle mirror assembly according to claim 1, wherein each of said prism grooves has two sidewalls each of which defines an included angle of 45° with said front major surface.

6. The vehicle mirror assembly according to claim 1, wherein said rear major surface is formed with a diffusing region for diffusing the light beam passing therethrough.

7. The vehicle mirror assembly according to claim 6, wherein said diffusing region is formed by sandblasting.

* * * * *